United States Patent
Arnold et al.

(10) Patent No.: US 6,715,060 B1
(45) Date of Patent: Mar. 30, 2004

(54) UTILIZING A SCOREBOARD WITH MULTI-BIT REGISTERS TO INDICATE A PROGRESSION STATUS OF AN INSTRUCTION THAT RETRIEVES DATA

(75) Inventors: Ronny Lee Arnold, Ft Collins, CO (US); Donald Charles Soltis, Jr., Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/493,986

(22) Filed: Jan. 28, 2000

(51) Int. Cl.$^7$ ................................................. G06F 9/40
(52) U.S. Cl. ..................................................... 712/217
(58) Field of Search ................................. 712/216, 217

(56) References Cited

U.S. PATENT DOCUMENTS

| | | | | |
|---|---|---|---|---|
| 4,903,196 A | * | 2/1990 | Pomerene et al. | 712/217 |
| 5,838,943 A | * | 11/1998 | Ramagopal et al. | 712/218 |
| 5,859,999 A | | 1/1999 | Morris et al. | 395/565 |
| 5,860,017 A | | 1/1999 | Sharangpani et al. | 395/800.23 |
| 6,195,676 B1 | * | 2/2001 | Spix et al. | 709/107 |
| 6,219,781 B1 | * | 4/2001 | Arora | 712/217 |

OTHER PUBLICATIONS

Alexander Wolfe, Patents Shed Light on Merced: Techniques of Predication and Speculation Detailed, Electronic Engineering Times, Feb. 15, 1999, pp. 43–44.

Patterson, et al., "Computer Architecture: A Quantiative Approach," Morgan Kaufmann Publishers, Inc., 2ed, pp. 150–154 and 191–193.

Gary Lauterbach, Sun's Next Generation High–End SPARC Microprocessor, Microprocessor Forum, Oct. 14–15, 1997, pp. 3–6.

\* cited by examiner

*Primary Examiner*—Richard L. Ellis
*Assistant Examiner*—Tonia L. Meonske (57) ABSTRACT

Generally, the present invention provides a system and method for processing instructions of a computer program and for indicating instruction attribute and/or status information so that the efficiency of the processing system may be increased. In architecture, the system of the present invention utilizes a pipeline, a scoreboard, and hazard detection circuitry. The pipeline processes and executes instructions of a computer program. Many of the instructions include register identifiers that identify registers where data should be written when the instructions are executed. When the data produced by execution of one of the instructions has yet to be written to the register identified by the one instruction's register identifier and is unavailable for use in executing other instructions of the program, the one instruction's register identifier is transmitted to the scoreboard. The scoreboard includes a plurality of multi-bit registers, and a first bit in one of the multi-bit registers is changed based on the received register identifier. The scoreboard also may receive data associated with the one instruction and may change a second bit in the one register based on the received data. Therefore, each register in the scoreboard indicates whether a pending write to a particular register exists and indicates information associated with the instruction causing the pending write.

26 Claims, 5 Drawing Sheets

(Prior Art)

UTILIZING A SCOREBOARD WITH MULTI-BIT REGISTERS TO INDICATE A PROGRESSION STATUS OF AN INSTRUCTION THAT RETRIEVES DATA

BACKGROUND OF THE INVENTION

1. Field of the Invention

The present invention generally relates to data processing techniques and, in particular, to a processing system and method for processing instructions of a computer program and for indicating attribute and/or status information of long latency instructions so that the efficiency of the processing system may be increased.

2. Related Art

To increase the performance of many processors, pipeline processing has been developed. In pipeline processing, a processor is equipped with at least one pipeline that can simultaneously process multiple instructions. Therefore, execution of one instruction in the pipeline may be commenced before the results of execution of a preceding instruction in the pipeline are available, thereby creating certain data hazards.

For example, a first instruction, when executed, may produce data and write the data to a particular register, and a second instruction, when executed, may utilize the data produced by the first instruction. If the second instruction executes before the data produced by the first instruction is available, then a data error occurs. Consequently, a data hazard exists between the two instructions until the data produced by the first instruction is available. This type of data hazard is commonly referred to as a "read-after-write" (RAW) data hazard.

In another situation, the second instruction, when executed, may write data to the same register as the first instruction, which commenced execution before the second instruction. If the second instruction produces and writes its data to the register before the first instruction, then a data error is possible, since the register will contain the data of the first instruction instead of the second instruction after both instructions are fully executed and processed. As a result, a data hazard exists between the two instructions until the data produced by the first instruction is written to the register. This type of data hazard is commonly referred to as a "write-after-write" (WAW) data hazard.

To help prevent errors from the aforementioned data hazards and other types of data hazards, most superscalar processors include hazard detection circuitry that detects data hazards associated with the instructions being processed by the pipelines of the processor. The hazard detection circuitry usually detects the aforementioned data hazards by detecting when a later instruction utilizes (e.g., writes to or reads from) the same register as an earlier instruction that has yet to produce available data.

However, the data produced by a first instruction may not be available for use by other instructions or for writing to a particular register of a processor until well after the first instruction has been retired by the pipeline processing the first instruction (e.g., until well after the first instruction has exited its pipeline). For example, a load instruction, when executed, may generate a request to retrieve data from memory external to the processor. Depending on where the data is located in the memory hierarchy, it may take anywhere between a few clock cycles to several thousand clock cycles for the data to be returned to the processor in response to the aforementioned request. Therefore, the processor may not receive the data produced by the first instruction until after the first instruction exits the processor's pipelines or is otherwise retired. In other words, the data produced by the first instruction does not become available for use in executing other instructions until after the first instruction exits the processor's pipeline or is otherwise retired. An instruction, such as the aforementioned load instruction, that produces available data after the instruction has been retired by a pipeline shall be referred to herein as a "long latency instruction."

To facilitate the process of detecting data hazards for long latency instructions, the processor is usually equipped with a register file, commonly referred to as a "scoreboard," that indicates when the processor has yet to receive data produced in response to a previous execution of a producer (i.e., an instruction that produces data). In other words, the scoreboard indicates when there is a pending write to a general register. As used herein, the term "pending write" shall be used to refer to a situation in which data produced by an earlier executed instruction is destined for a general register but has yet to be written to the general register. As known in the art, a "general register" is one of a set of registers that are written to via the execution of write instructions and/or are read from via the execution of read instructions.

The scoreboard includes a plurality of registers in which each register contains a bit value. Each scoreboard register and the bit value contained therein correspond to one of the general registers of the processor that receives data produced by the execution of write instructions. When a write instruction is retired before the data produced by the write instruction has been written to the general register that is to receive the data, the bit value in the scoreboard register that corresponds to the general register is asserted. Furthermore, when the data produced by the write instruction is finally written to the general register, the aforementioned bit value is deasserted. Therefore, to determine whether there is a pending write to one of the general registers, the bit value in the scoreboard register corresponding to the one general register can be analyzed.

Each asserted bit value in the scoreboard indicates that there is a pending write to the general register corresponding to the asserted bit value. Therefore, any instruction being processed by the processor should be prevented from writing to or reading from the foregoing general register to prevent errors from RAW or WAW data hazards, until at least the pending write expires (i.e., until the data destined for the general register is actually written to the general register or otherwise becomes available). Furthermore, each deasserted bit value in the scoreboard indicates there is presently no pending write to the general register corresponding to the deasserted bit value. Therefore, an instruction being processed by the processor may read from or write to the foregoing general register without creating any errors from RAW or WAW data hazards.

When a RAW or WAW data hazard is detected by analyzing the scoreboard or otherwise, errors from the RAW or WAW data hazard are often prevented by stalling one or more instructions being processed by the processor. U.S. patent application entitled "Superscalar Processing System and Method for Efficiently Performing In Order Processing of Instructions," assigned Ser. No. 09/390,199, and filed on Sep. 7, 1999, which is incorporated herein by reference, describes in more detail a process of stalling instructions to prevent data hazards. When an instruction is stalled, the processor temporarily refrains from further processing the instruction. Therefore, although a stall may prevent errors, a stall adversely impacts processor performance, since the amount of time for an instruction to traverse through the pipelines is increased when the instruction is stalled. To minimize the adverse impact of stalls on processor performance, an instruction should be stalled no longer than necessary to ensure that further processing of the instruction will not produce a data error.

Furthermore, while an instruction is being stepped through a pipeline of a procssor, the processor maintains certain information indicative of the instruction's attributes and/or status. The processing system often utilizes this information to control the processing of the instruction and to quickly resolve data hazards associated with the instruction so that the number and/or duration of stalls is minimized. However, after an instruction is retired, the instruction has usually exited the processor, and the processor is no longer able to effectively utilize the attribute and/or status information maintained by the processor to resolve data hazards or to perform other functions.

Thus, a heretofore unaddressed need exists in the industry for providing a system and method of indicating attribute and/or status information associated with long latency instructions so that various efficiencies, such as the minimization of stalls, can be realized.

SUMMARY OF THE INVENTION

The present invention overcomes the inadequacies and deficiencies of the prior art as discussed hereinbefore. Generally, the present invention provides a system and method for processing instructions of a computer program and for indicating attribute and/or status information associated with the instructions. The present invention is particularly useful when processing long latency instructions.

In architecture, the system of the present invention utilizes a pipeline, a scoreboard, and hazard detection circuitry. The pipeline processes and executes instructions of a computer program. Many of the instructions include register identifiers that identify registers where data should be written when the instructions are executed. When the data produced by execution of one of the instructions has yet to be written to the register identified by the one instruction's register identifier and is unavailable for use in executing other instructions of the program, the one instruction's register identifier is transmitted to the scoreboard. The scoreboard includes a plurality of multi-bit registers, and a first bit in one of the multi-bit registers is changed based on the received register identifier. The scoreboard also may receive data, such as attribute and/or status data associated with the one instruction, and may change at least a second bit in the one register based on the received data. Therefore, each register in the scoreboard indicates whether a pending write to a particular register exists and indicates information associated with instruction causing the pending write.

The present invention can also be viewed as providing a method for processing instructions of a computer program. The method can be broadly conceptualized by the following steps: providing a pipeline and a scoreboard, the scoreboard including a plurality of multi-bit registers; processing one of the instructions via the pipeline; transmitting a register identifier defined by the one instruction to the scoreboard; changing a first bit in one of the multi-bit registers based on the register identifier; transmitting data associated with the one instruction to the scoreboard; changing a second bit in the one register based on the data; detecting that data produced via execution of the one instruction is unavailable; and performing the changing a first bit step in response to the step of detecting that data produced via execution of the one instruction is unavailable.

Other features and advantages of the present invention will become apparent to one skilled in the art upon examination of the following detailed description, when read in conjunction with the accompanying drawings. It is intended that all such features and advantages be included herein within the scope of the present invention and protected by the claims

BRIEF DESCRIPTION OF THE DRAWINGS

The invention can be better understood with reference to the following drawings. The elements of the drawings are not necessarily to scale relative to each other, emphasis instead being placed upon clearly illustrating the principles of the invention. Furthermore, like reference numerals designate corresponding parts throughout the several views.

DETAILED DESCRIPTION OF THE PREFERRED EMBODIMENT

The present invention generally relates to a processing system that tracks instruction attribute and/or status information for long latency instructions. To better illustrate the principles of the present invention, first refer to FIG. 1, which depicts a conventional superscalar processing system 15. The processing system 15 includes an instruction dispersal unit 18 that receives instructions of a computer program and assigns each instruction to one of a plurality of pipelines 21. Each pipeline 21 is configured to process and execute, if appropriate, each instruction assigned to the pipeline 21.

Each pipeline 21 is usually configured to only process particular types of instructions (e.g., integer operation, floating point operation, memory operation, etc.). Therefore, the instruction dispersal unit 18 is configured to assign each instruction only to a pipeline 21 compatible with the instruction. Furthermore, although control circuitry 24, hazard detection circuitry 25, and register file 27, which is often referred to as a "scoreboard," are shown for simplicity as being coupled to one pipeline 21 in FIG. 1, it should be noted that each pipeline 21 is similarly coupled to the control circuitry 24, the hazard detection circuitry 25, and the scoreboard 27. However, if desired, the connection 31, which couples the one pipeline 21 to a write port of the scoreboard 27, may be removed for any pipeline 21 that does not process a long latency instruction.

It is well known that data is often written to and read from general registers 29 associated with the processing system 15 in executing the instructions processed by the processing system 15. Furthermore, when a general register 29 is utilized (i.e., written to or read from) in executing an instruction, the instruction usually includes a register identifier that identifies the general register 29. The register identifier is usually a n-bit encoded binary value (where n is an integer greater than 0) that is unique to the general register 29 identified by the register identifier.

The hazard detection circuitry 25 is configured to receive and compare the register identifiers included in the instructions being processed by the pipelines 21 to determine if any data hazards, such as RAW and/or WAW data hazards, exist between the instructions processed by the pipelines 21. If the hazard detection circuitry 25 detects a data hazard, the hazard detection circuitry 25 transmits a notification signal to the control circuitry 24 indicating which instruction in the pipelines 21 is associated with the data hazard. In response, the control circuitry 24 may transmit a control signal to one or more of the pipelines 21 to cause the one or more pipelines 21 to stall (i.e., temporarily prevent further processing of instructions) in order to prevent a data error associated with the data hazard. Once the data hazard expires, the control circuitry 24 enables the processing of the stalled instruction or instructions to resume.

Execution of some instructions causes the retrieval of data from external registers or locations in memory outside of the processing system 15. When such data is received by the processing system 15, the processing system 15 usually writes the data to a general register 29 identified by the instruction that retrieved the data. Usually, the data is then utilized to execute a later instruction.

The time required to retrieve the data varies depending on where the data is located, and the instruction that requests the retrieval of the data is often retired before the data is received by the processing system 15. However, once an instruction is retired and has exited the pipelines 21, the hazard detection circuitry 25 usually can no longer detect a RAW or a WAW data hazard associated with the instruction by only comparing register identifiers of the instructions in the pipelines 21, even though such a data hazard may exist until the retrieved data at least is received by the processing system 15.

Figure 1:
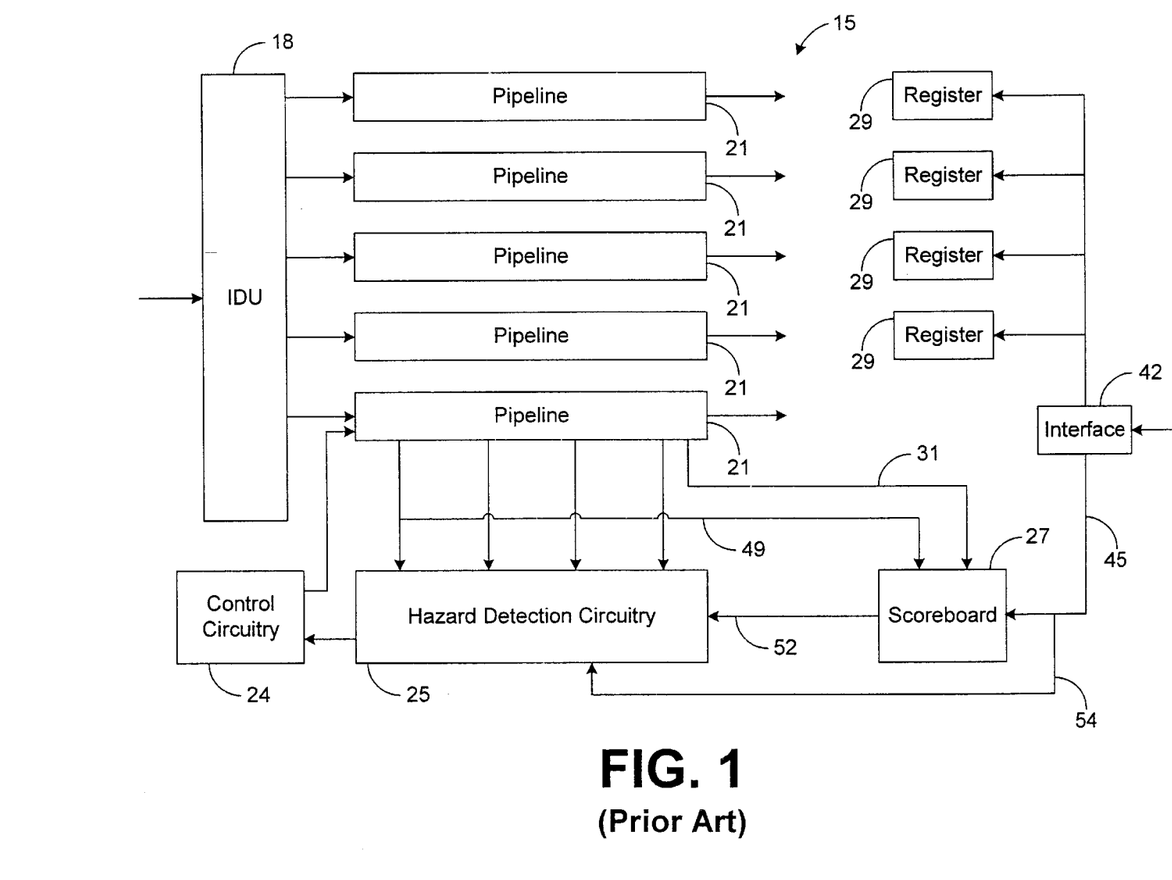
FIG. 1 is a block diagram illustrating a conventional processing system.

Therefore, additional steps are usually taken to detect data hazards associated with instructions that have been retired. For example, in the embodiment shown by FIG. 1, if a pending write to one of the registers 29 is caused by a producer that is about to be retired, then the register identifier included in the producer and associated with the pending write (i.e., identifying the general register 29 that is to be written to) is transmitted to scoreboard 27 via connection 31, which is preferably at least a n-bit connection. It should be noted that, for simplicity, FIG. 1 shows only one connection 31 coupling one of the pipelines 21 to the scoreboard 27. However, there are typically multiple connections 31 that respectively couple multiple pipelines 21 to different write ports of the scoreboard 27. Each pipeline 21 that processes long latency instructions should be coupled to the scoreboard 27 in the manner that the connection 31 couples one of the pipelines 21 to the scoreboard 27 in FIG. 1, although more pipelines 21 may be similarly coupled to the scoreboard 27, if desired.

Figure 2:
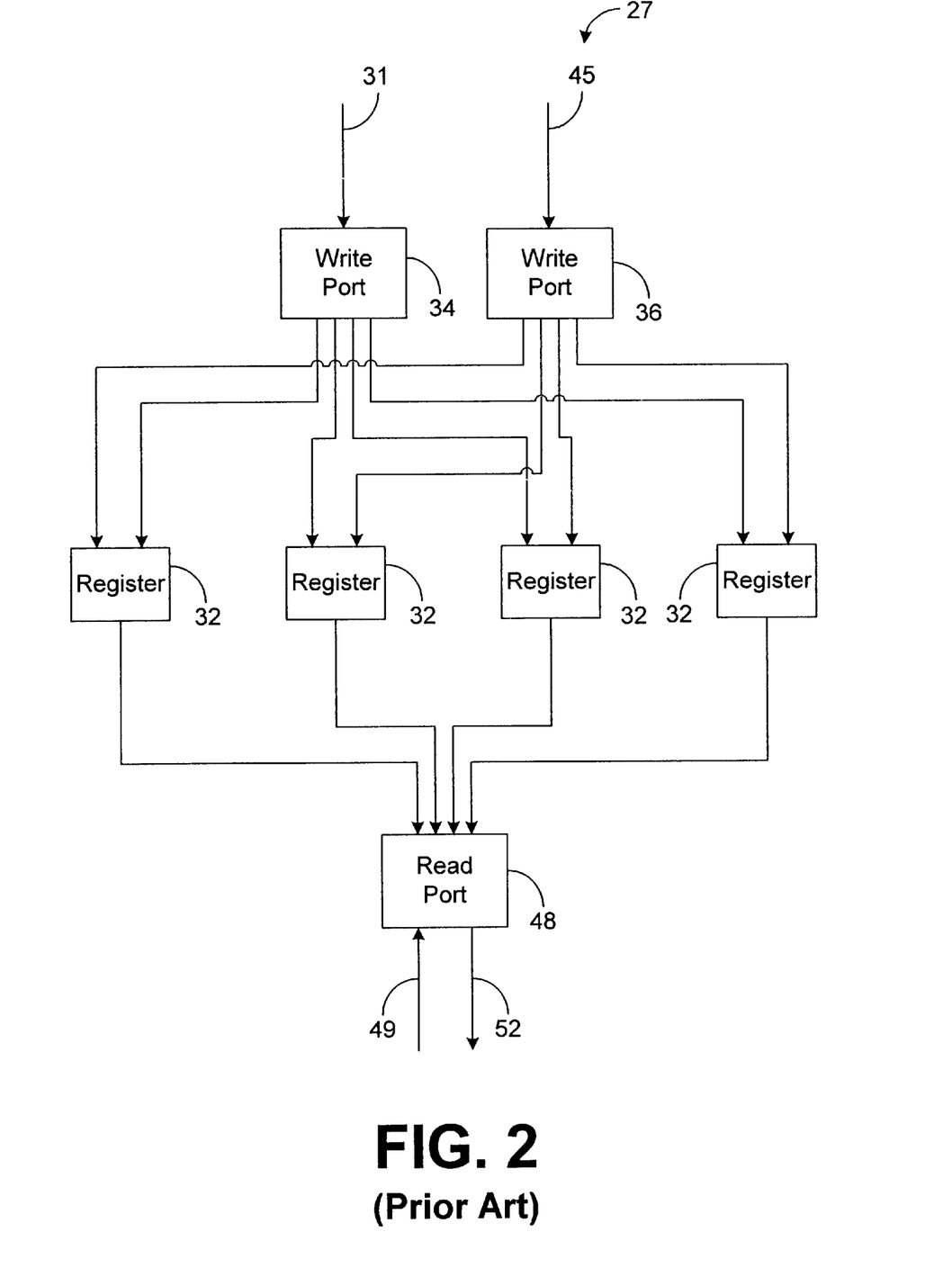
FIG. 2 is a block diagram illustrating a scoreboard of the processing system depicted in FIG. 1.

The scoreboard 27 includes a plurality of registers 32, as shown by FIG. 2. Each of the scoreboard registers 32 respectively corresponds to a different one of the general registers 29 (FIG. 1) and contains a bit value. The scoreboard 27 also includes a write port 34 that is coupled to connection 31. The write port 34 receives the aforementioned register identifier included in the producer associated with the pending write and asserts the bit value in the scoreboard register 32 corresponding to the general register 29 identified by the received register identifier. The register identifier is often encoded, and the write port 34, therefore, decodes the register identifier before asserting the bit in the appropriate scoreboard register 32.

Referring again to FIG. 1, the data to be written to a general register 29 associated with a pending write is usually received by an interface 42 along with a register identifier that identifies the general register 29 where the data is to be written. The interface 42 transmits the foregoing data to the identified general register 29 and transmits the register identifier to the scoreboard 27 via connection 45. The scoreboard 27 includes a write port 36 (FIG. 2) coupled to connection 45 that receives the register identifier from connection 45 and deasserts the bit value in the scoreboard register 32 corresponding to the general register 29 identified by the register identifier.

By asserting and deasserting the bit values in the registers 32, as described above, the hazard detection circuitry 25 can detect data hazards associated with retired instructions based on the bits contained in the registers 32 of the scoreboard 27. In this regard, if a bit contained in a scoreboard register 32 that corresponds to a particular one of the general registers 29 is asserted, then there exists a pending write to the one general register 29. Consequently, a RAW or WAW data hazard may exist, if another instruction being processed by the pipelines 21 utilizes data from the one general register 29. However, if the bit contained in the foregoing register 32 is deasserted, then there is presently no pending write to the one general register 32 by a retired instruction. Therefore, a RAW or WAW data hazard associated with a retired instruction that writes to the one general register 29 should not exist.

Each pipeline 21 is usually coupled to at least one read port 48, as shown by FIGS. 1 and 2 for one of the pipelines 21. To detect a data hazard between a pending instruction in a pipeline 21 and a previously retired instruction, the pipeline 21 usually transmits via connection 49 an encoded n-bit register identifier identifying a general register 29 that is to be used in executing the pending instruction. The read port 48 receives and decodes the register identifier. The read port 48 also analyzes the bit contained in the scoreboard register 32 that corresponds with the general register 29 identified by the register identifier. If the bit in the foregoing scoreboard register 32 indicates that there is a pending write to the general register 29 identified by the register identifier, then the read port 48 transmits, via connection 52, a signal indicating that a data hazard associated with the foregoing pending instruction may exist. For example, if the bit in the scoreboard register 32 analyzed by the read port 48 is asserted, then the read port 48 transmits an asserted one bit signal. Otherwise, the read port 48 transmits a deasserted one bit signal. Based on the signal transmitted across connection 52, the hazard detection circuitry 25 determines whether or not a data hazard associated with the pending instruction exists.

Note that there is a finite amount of delay associated with writing to and reading from the scoreboard 27. Therefore, to quickly provide the hazard detection circuitry 25 with updates, the register identifiers transmitted to the scoreboard 27 via the interface 42 also bypass the scoreboard 27 via bypass connection 54. In certain situations, the hazard detection circuitry 25 may utilize register identifiers from bypass connection 54 to prevent or remove a stall on an instruction in one of the pipelines 21.

Furthermore, each instruction may utilize more than one general register 29 when executed and, therefore, may contain more than one register identifier. A separate set of connections 49 and 52 and a separate read port 48 are usually provided for each possible register identifier. For example, if the architecture of the system 15 is such that each instruction in each pipeline 21 may include up to three register identifiers, then there is usually at least three read ports 48 coupled to each pipeline 21 via three sets of connections 49.

Although the scoreboard 27 enables data hazards associated with retired instructions to be detected, a problem with the system 15 is that, as described in the Background section, attribute and/or status information associated with an instruction is not utilized by the processing system 15 once the instruction is retired. Therefore, the processing system 15 fails to resolve data hazards in the most efficient manner possible.

Figure 3:
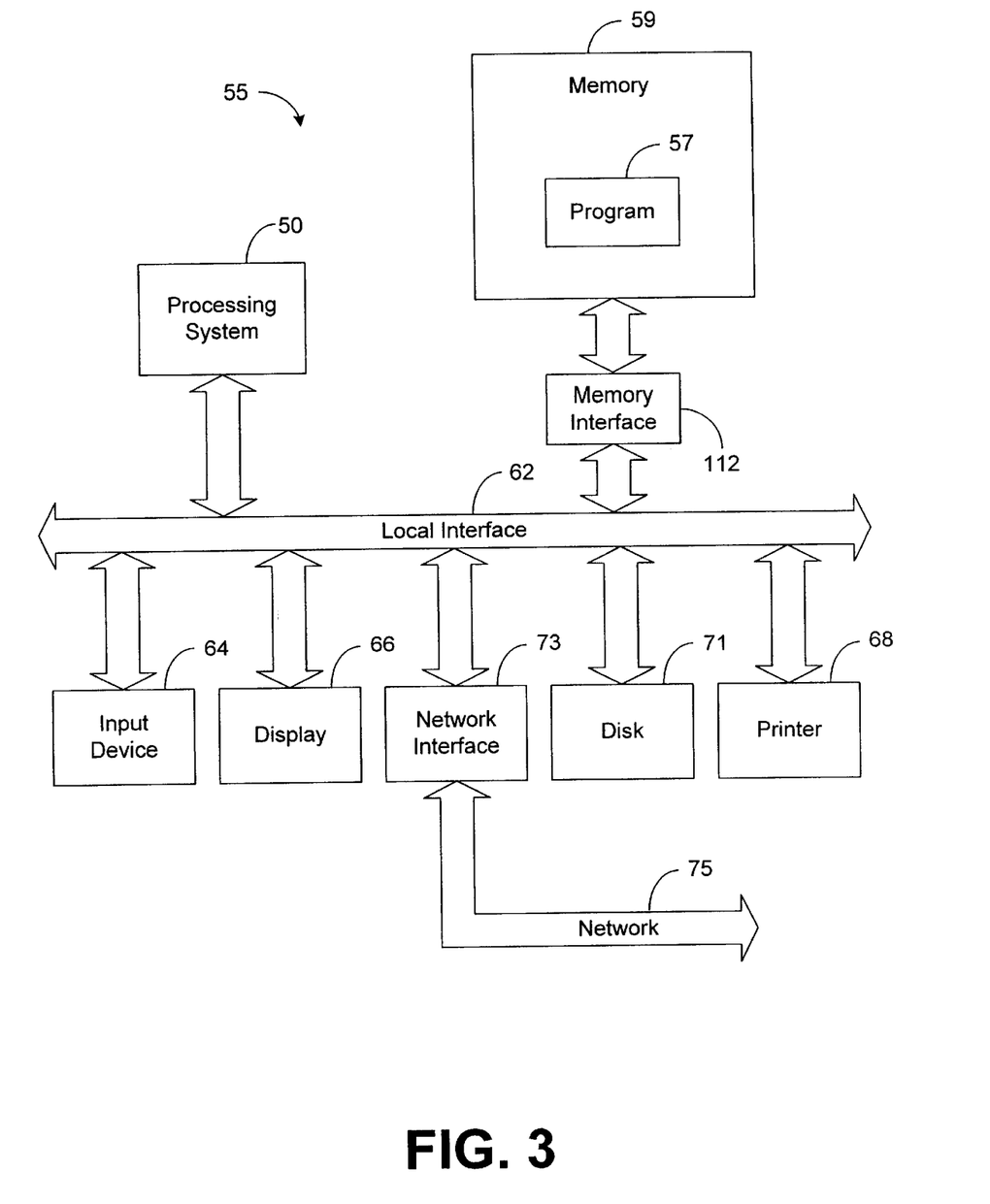
FIG. 3 is a block diagram illustrating a computer system employing a processing system in accordance with the present invention.

In general, the present invention provides a processing system that tracks the attribute and/or status information of retired instructions so that various operations, such as hazard detections, can occur more efficiently. FIG. 3 depicts a processing system 50 in accordance with the principles of the preferred embodiment of the present invention. As shown by FIG. 3, the processing system 50 may be employed within a computer system 55 for executing instructions from a computer program 57 that is stored in memory 59.

The processing system 50 communicates to and drives the other elements within the system 55 via a local interface 62, which can include one or more buses. Furthermore, an input device 64, for example, a keyboard or a mouse, can be used to input data from a user of the system 55, and screen display 66 or a printer 68 can be used to output data to the user. A disk storage mechanism 71 can be connected to the local interface 62 to transfer data to and from a nonvolatile disk (e.g., magnetic, optical, etc.). The system 55 can be connected to a network interface 73 that allows the system to exchange data with a network 75.

Figure 4:
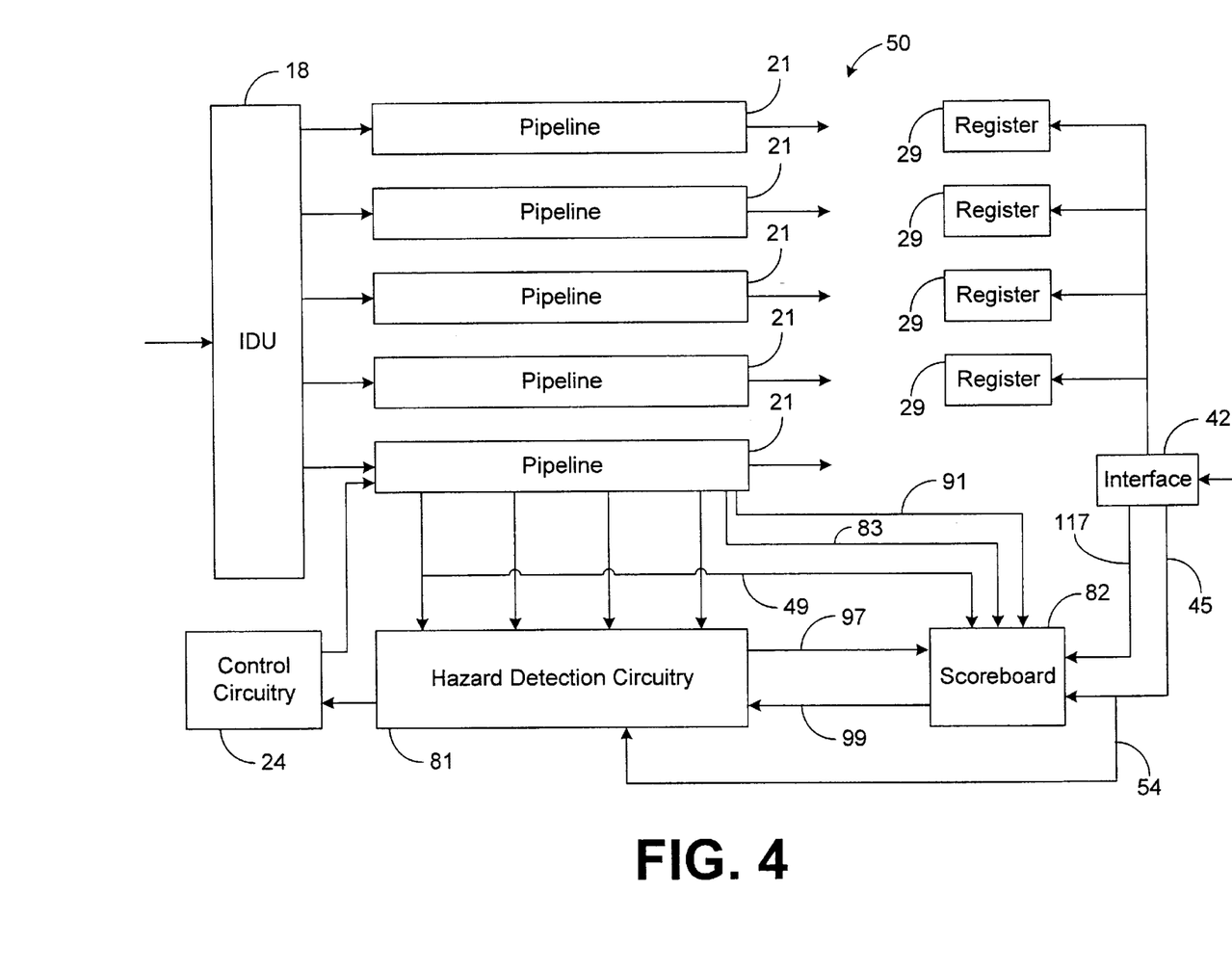
FIG. 4 is a block diagram illustrating the processing system depicted by FIG. 3.

Similar to conventional system 15, processing system 50 includes at least one pipeline 21, control circuitry 24, hazard detection circuitry 81, and a scoreboard 82, as shown by FIG. 4. Although only one pipeline 21 is coupled to the control circuitry 24 and the hazard detection circuitry 81 in FIG. 4, the other pipelines 21 are similarly coupled to the control circuitry 24 and the hazard detection circuitry 81 in the preferred embodiment. Furthermore, FIG. 4 shows one pipeline 21 coupled to the scoreboard 82 via connections 83 and 91. Each pipeline 21 that processes long latency instructions is similarly coupled to the scoreboard 82 in the preferred embodiment, although other pipelines 21 can be similarly coupled to the scoreboard 82, if desired.

The hazard detection circuitry 81 of the preferred embodiment detects data hazards associated with the instructions being processed by the pipelines 21, based on at least the register identifiers of the foregoing instructions. To this end, register identifiers associated with each instruction in the pipelines 21 are respectively transmitted to hazard detection circuitry 81, which detects data hazards based on the register identifiers received by the hazard detection circuitry 81. U.S. patent application Ser. No. 09/493,504 entitled "System and Method for Coalescing Data Utilized to Detect Data Hazards," and U.S. patent application Ser. No. 09/490,389 entitled "System and Method for Utilizing Instruction Attributes to Detect Data Hazards," which are both incorporated herein by reference, further describe techniques that may be employed to detect data hazards based on the register identifiers associated with the instructions being processed by the pipelines 21.

Figure 5:
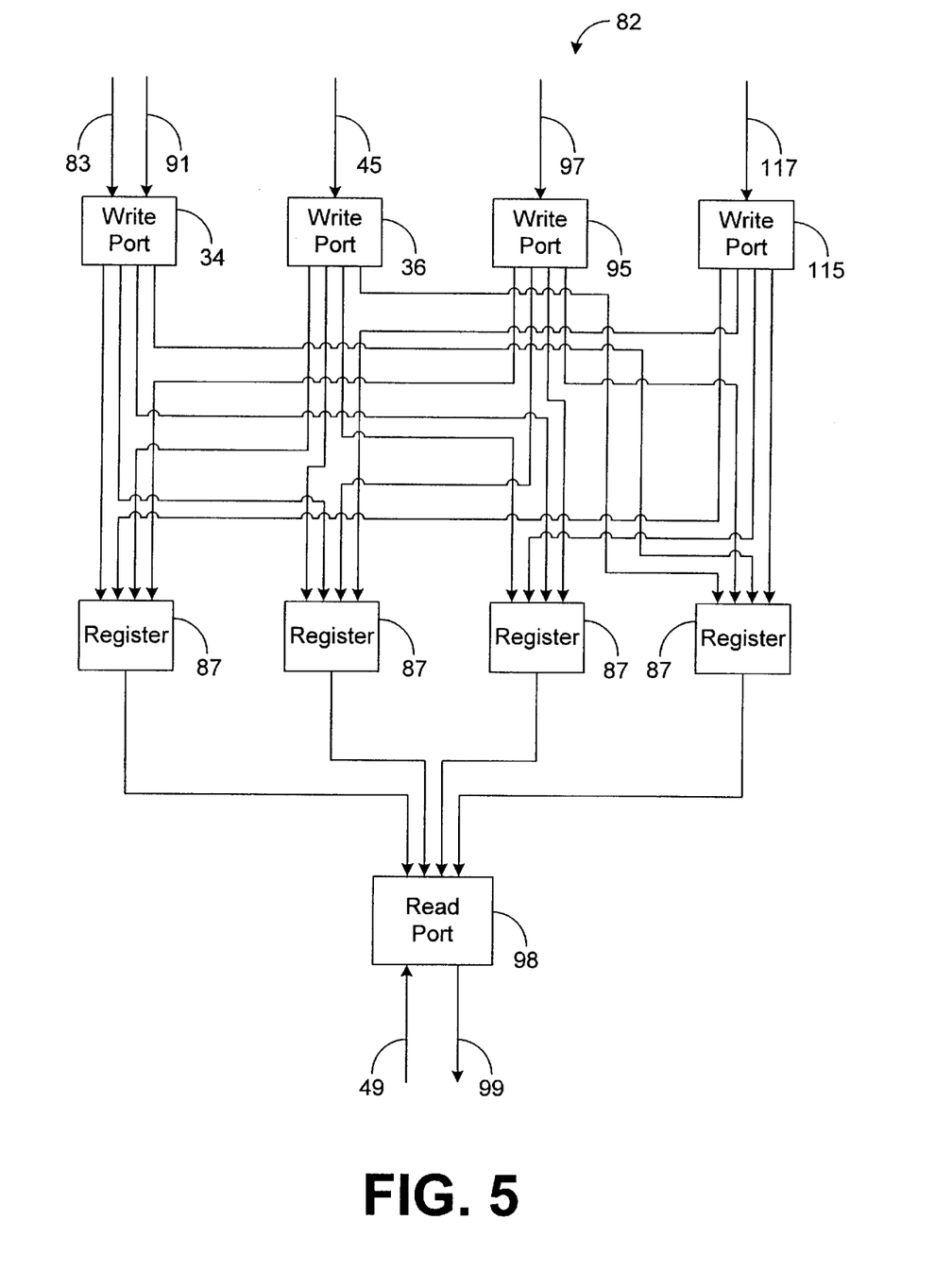
FIG. 5 is a block diagram illustrating a scoreboard of the processing system depicted in FIG. 4.

As shown in FIG. 5, the scoreboard 82 includes a plurality of multi-bit registers 87, in which each scoreboard register 87 and, therefore, the bit values contained therein correspond to a particular general register 29 (FIG. 4). Each scoreboard register 87 includes a state bit and one or more attribute and/or status bits. The attribute and status bits will be discussed in more detail hereinafter. The state bit, similar to the bit contained in conventional scoreboard registers 32, indicates whether a pending write to a corresponding general register 29 exists. When asserted, a state bit in a scoreboard register 87 indicates that there is a pending write by a retired instruction to the corresponding general register 29. When deasserted, the state bit indicates that no such pending write exists. Therefore, the scoreboard 82, similar to conventional scoreboard 27, indicates which general registers 29 are associated with pending writes caused by retired instructions.

As an example, assume that a load instruction is about to be retired by one of the pipelines 21 before the data retrieved in response to the load instruction is received by interface 42. In this situation, a pending write to the register 29 identified by a register identifier included in the load instruction exists until the foregoing data is written to the register 29 or until the load instruction is canceled. Therefore, to indicate the existence of the pending write, the pipeline 21 processing the load instruction transmits the register identifier of the load instruction to the scoreboard 82 via connection 83. The write port 34 receives the register identifier and, in response to the register identifier, asserts the state bit in the scoreboard register 87 corresponding to the general register 29 that is to receive the data retrieved in response to the load instruction (i.e., the register 29 identified by the register identifier transmitted across connection 83).

When the data retrieved in response to the load instruction is received by interface 42, the interface 42 transmits the retrieved data to the foregoing general register 29 and transmits a register identifier identifying the foregoing general register 29 to the scoreboard 82. In response, the write port 36 deasserts the state bit in the scoreboard register 87 corresponding to the foregoing general register 29. As a result, when asserted, the state bit indicates that a pending write to the corresponding general register 29 exists, and when deasserted, the state bit indicates that no such pending write exists.

If desired, attribute data associated with the load instruction may be transmitted, via connection 91, to the scoreboard 82 along with the aforementioned register identifier transmitted via connection 83. For example, in the preferred embodiment, a speculative bit associated with the load instruction is transmitted to the scoreboard 82 via connection 91. When deasserted, the speculative bit indicates that the load instruction is non-speculative and should be fully executed. When asserted, the speculative bit indicates that the load instruction is speculative.

As known in the art, a speculative instruction is an instruction that is issued during a program run, even though the data produced by the instruction may not be used during the program run. If another valid instruction utilizing the data produced by the speculative instruction is detected, then the speculative instruction is converted to a non-speculative instruction to prevent data errors. This can be accomplished by deasserting the speculative bit. Therefore, if the speculative bit transmitted via connection 91 is asserted, then the instruction associated with this asserted speculative bit was issued speculatively, and another valid instruction utilizing the data produced by the foregoing instruction has not been detected. Accordingly, it may be possible to cancel (i.e., prevent full execution of) the instruction associated with the speculative bit without causing any data errors.

In this regard, it is well known that each instruction of a computer program 57 is not necessarily executed during each run of the program 57. Different instructions are executed during different runs of the program 57 based on certain run time conditions. Therefore, during a particular run of the program 57, it is possible that none of the instructions executed by the processing system 50 utilize the data produced by a particular speculative instruction. In such a situation, it is not necessary to execute the speculative instruction, and the speculative instruction can be canceled. U.S. Pat. No. 5,860,017 entitled "Processor and Method for Speculatively Executing Instructions from Multiple Instruction Streams Indicated by a Branch Instruction," which is incorporated herein by reference, describes in more detail processing of speculative instructions.

U.S. patent application entitled "Superscalar Processing System and Method for Efficiently Preventing Errors Caused by Write-After-Write Data Hazards," Ser. No. 09/391,023 now U.S. Pat. No. 6,470,445 which is incorporated herein by reference, describes in more detail how the hazard detection circuitry 81 may detect whether or not another instruction utilizes the data produced by a speculative producer, such as the aforementioned load instruction when the load instruction is associated with an asserted speculative bit. In this regard, the pipelines 21 execute the instructions of a computer program 57 in program order. When the hazard detection circuitry 81 detects that a write instruction is the next instruction to utilize a register 29 after a pending write to the register 29 is created in response to the speculative producer, the hazard detection circuitry 81 determines that the data produced by the speculative producer is not utilized by another instruction executed by the pipelines 21 during the present program run. Therefore, the hazard detection circuitry 81 determines that the speculative producer may be canceled.

However, if the hazard detection circuitry 81 detects that a read instruction is the next instruction to utilize a register 29 after a pending write to the register 29 is created in response to the speculative producer, then the hazard detection circuitry 81 detects that another instruction executed by the pipelines 21 utilizes the data produced by the speculative producer. Therefore, the hazard detection circuitry 81 determines that the speculative producer should be converted to non-speculative and that the producer may not be canceled.

Since the speculative bit associated with a producer indicates, when asserted, that another instruction utilizing the data produced by the producer has not been detected, the speculative bit may be used to indicate whether or not the producer can be canceled. For example, if the speculative bit is asserted (i.e., indicates that the producer is speculative), then it is possible that the data produced by the producer will not be used by any of the instructions executed by the processing system 50. Therefore, it may be possible to cancel the producer. If, on the other hand, the speculative bit is deasserted (i.e., indicates that the producer is non-speculative), then the producer may not be canceled.

Furthermore, each of the scoreboard registers 87 includes attribute and/or status bits in addition to the state bit described hereinbefore. When the write port 34 receives the speculative bit and the register identifier respectively transmitted across connections 91 and 83, the write port 34 is configured to write the speculative bit to one of the additional bits in the scoreboard register 87 corresponding to the general register 29 identified by the register identifier. Therefore, not only does the scoreboard register 87 indicate whether a pending write to the corresponding general register 29 exists, but the scoreboard register 87 also indicates whether the producer that caused the pending write is speculative or non-speculative. If the speculative bit in the scoreboard register 87 is asserted, then the foregoing producer is speculative, and if the speculative bit is deasserted, then the foregoing producer is non-speculative.

Moreover, when the hazard detection circuitry 81 detects that one of the pending instructions being processed by one of the pipelines 21 utilizes a register 29 associated with a pending write caused by a retired producer, such as a retired load instruction, the hazard detection circuitry 81 first determines if the pending instruction is a read instruction. If the pending instruction is a read instruction, then the data produced by the retired load instruction should be written to the register 29 to prevent data errors. In other words, the retired load instruction should not be canceled. Furthermore, to ensure that the scoreboard 82 indicates that the retired load instruction is non-speculative, the hazard detection circuitry 81 transmits a register identifier identifying the foregoing register 29 to write port 95 via connection 97. In response, the write port 95 deasserts the speculative bit in the scoreboard register 87 corresponding with the register 29 identified by the register identifier transmitted across connection 97. As a result, the retired load instruction associated with the pending write is indicated as non-speculative, thereby preventing the hazard detection circuitry 81 from canceling the retired load instruction in response to the detection of any subsequent write instructions.

If, however, the aforementioned pending instruction is a write instruction, then the hazard detection circuitry 81 analyzes the speculative bit from the foregoing scoreboard register 87. In this regard, when the pipeline 21 processing the pending instruction transmits the register identifier of the pending instruction across connection 49, as previously described, the read port 98 is preferably configured to transmit across connection 99 each bit in the scoreboard 87 corresponding to the register 29 identified by the register identifier. If the speculative bit transmitted across connection 99 indicates that the retired load instruction is speculative, then the hazard detection circuitry 81 is aware that the hazard detection circuitry 81 has yet to detect another instruction that reads from the foregoing register 29 and that is executed between the retired load instruction and the pending instruction. Therefore, the hazard detection circuitry 81 is aware that none of the instructions being processed by the pipelines 21 utilizes the data produced by the retired load instruction, assuming the hazard detection circuitry 81 analyzes the instructions in program order. As a result, the hazard detection circuitry 81 attempts to cancel the retired load instruction. The aforementioned U.S. patent application entitled "Superscalar Processing System and Method for Efficiently Preventing Errors Caused by Write-After-Write Data Hazards," describes in more detail how the hazard detection circuitry 81 may attempt to cancel the load instruction.

If the hazard detection circuitry 81 successfully cancels the retired load instruction, then the pending write expires, and there is no longer a data hazard associated with the aforementioned pending write. Therefore, the hazard detection circuitry 81 refrains from detecting a data hazard associated with the retired load instruction.

Furthermore, as indicated in the aforementioned patent application, when the retired load instruction is successfully canceled, a register identifier identifying the register 29 that would have received the data produced by the canceled load instruction is preferably transmitted to interface 42 to acknowledge successful cancellation of the load instruction. The interface 42 then transmits this register identifier to write port 36, which deasserts the state bit in the scoreboard register 87 corresponding to the register 29 identified by the register identifier, thereby indicating that a pending write associated with this register 29 no longer exists.

If, on the other hand, the hazard detection circuitry 81 fails to cancel the retired load instruction when the pending instruction is a speculative write instruction, then a WAW data hazard exists between the pending instruction and the retired load instruction. As a result, the hazard detection circuitry 81 stalls the pending instruction until the pending write to the foregoing register 29 expires. In other words, the hazard detection circuitry 81 stalls the pending instruction until the state bit in the scoreboard register 87 corresponding with the register 29 utilized by the pending instruction is deasserted.

By implementing the foregoing techniques, the adverse impact of stalls is reduced, since the occurrence of stalls associated with retired producers is prevented when the retired producers can be canceled.

To help the hazard detection circuitry 81 determine whether or not a retired load instruction can be successfully canceled, each scoreboard register 87 preferably includes a status bit in addition to the aforementioned speculative bit and state bit. The status bit indicates how far the search for data in response to the retired load instruction has progressed and is preferably initialized to a deasserted value each time the state bit is asserted in response to a pending write.

In this regard, during the execution of a load instruction, a request for the retrieval of data is usually transmitted from the processing system 50 to a memory interface 112 (FIG. 3). In response to the request, the memory interface 112 initiates a search for the data according to a predefined algorithm. For example, the memory interface 112 may first search for the requested data in cache memory. If the requested data is not found in the cache memory, the memory interface 112 may then search in main memory. The memory interface 112 continues to search different levels of the memory hierarchy until the requested data is found or until the memory interface 112 determines that retrieval of the requested data is not possible. Once the data is found, the search is terminated, and the data is transmitted to interface 42 along with the register identifier identifying the register 29 where the data is to be written.

To cancel the load instruction, the hazard detection circuitry 81 transmits a request for cancellation to the memory interface 112. In response to the request, the memory interface 112 terminates the search for the requested data. If the requested data has been found, then the memory interface 112 refrains from transmitting the data to the interface 42.

However, depending on the architecture of the computer system 55, it is possible that the load instruction cannot be canceled once the search by the memory interface 112 has progressed beyond a certain point (e.g., once the memory interface 112 has initiated a search of a particular memory location in the memory hierarchy). As a result, once the memory search has progressed beyond a certain point (e.g., a point where the load instruction causing the search cannot be canceled), the memory interface 112 is configured to transmit to interface 42 (FIG. 5) a register identifier identifying the register 29 where the data is to be written once it is found. The interface 42 then transmits this register identifier to write port 115 of the scoreboard 82 via connection 117.

In response, the write port 115 is configured to assert the status bit in the scoreboard register 87 corresponding with the identified register 29. As a result, the scoreboard register 87 not only indicates whether or not a pending write associated with the corresponding register 29 exists, but also indicates whether or not the retired instruction causing the pending write can be canceled. Therefore, to determine whether or not a load instruction causing a pending write to a general register 29 can be canceled, the hazard detection circuitry 81 analyzes the status bit contained in the scoreboard register 87 corresponding to the general register 29. If deasserted, then the search for the load instruction has not progressed far enough such that the load instruction cannot be canceled. If asserted, then the search for the data requested by the load instruction has progressed far enough such that the load instruction cannot be canceled.

It should be noted that it may be desirable in some applications to know more precisely how far the search for data in the memory hierarchy has progressed. Therefore, there may be multiple status bits in each scoreboard register 87, in which each status bit indicates whether or not the search has progressed beyond a different point in the memory hierarchy.

Furthermore, other types of data may be maintained in the scoreboard registers 87 to indicate other types of attribute and/or status information. For example, each scoreboard register 87 may include a bank register bit. When the state bit indicates the existence of a pending write, the bank register bit indicates which register bank is to receive the data produced by the retired producer causing the pending write. In this regard, many processing systems 50 include a second bank of registers mirroring the registers 29 shown by FIG. 4. Each register in the second bank of registers can be respectively identified by the same register identifier identifying one of the registers 29. Whether data is written to or read from one of the registers 29 or the corresponding register in the second register bank is determined at run time and may change as the program 57 runs.

In addition, a data hazard does not exist between a consumer having the same register identifier as another producer when one of the registers 29 is used to execute one of the instructions and the corresponding register in the second register bank is used to execute the other instruction. Therefore, when a pipeline 21 transmits a state bit along with a register identifier to the scoreboard 82, the pipeline 21 may also transmit a bank register bit indicating whether one of the general registers 29 or one of the registers in the second bank is to be used to receive the data produced by the producer associated with the register identifier. In response, the scoreboard 82 may then update the state bit and the bank register bit in the appropriate scoreboard register 87 according to the techniques described hereinabove.

The hazard detection circuitry 81 may utilize the bank register bit to resolve data hazards. For example, if a consumer has a different bank register bit than the bank register bit contained in the scoreboard register 87 corresponding to the register 29 identified by the consumer's register identifier, then no data hazard exists even if the state bit in the scoreboard register 87 is asserted. It should be apparent to one skilled in the art that there are numerous other examples of data that may be contained in each scoreboard register 87 to indicate other parameters associated with long latency instructions without departing from the principles of the present invention.

Furthermore, the present invention has been described as controlling the bits contained in the scoreboard register 87 based on retired load instructions. However, data from other types of long latency instructions may be similarly used to control the bits contained in the scoreboard registers 87 in other embodiments.

It should be further emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A computer system for processing instructions of a computer program, comprising:
   a plurality of pipelines configured to process and execute said instructions; and
   a scoreboard coupled to said pipelines, said scoreboard having a plurality of multi-bit registers, said scoreboard configured to receive a register identifier from one of said pipelines and to change a first bit in one of said multi-bit registers in response to said register identifier, said first bit indicating whether a pending write to a register identified by said register identifier exists, said register identifier associated with one of said instructions processed by said pipeline, said scoreboard further configured to control a second bit in said one register based on whether an instruction for reading data retrieved by said pending write has been detected during said pending write,
   wherein said one instruction is a load instruction and wherein said scoreboard is configured to control a plurality of bits of said one multi-bit register such that said plurality of bits indicate which portions of a memory hierarchy have been searched in response to said one instruction.

2. The system of claim 1, further comprising circuitry configured to detect whether said one instruction can be canceled based on said plurality of bits.

3. The system of claim 1, further comprising circuitry configured to transmit said register identifier to said scoreboard in response to a determination that said one instruction is retired while said pending write exists.

4. The system of claim 1, further comprising circuitry coupled to said scoreboard, said circuitry configured to detect a data hazard based on said first and second bits.

5. A method for processing instructions of a computer program, comprising the steps of:
   providing a pipeline and a scoreboard, said scoreboard including a plurality of multi-bit registers;
   processing one of said instructions via said pipeline;
   detecting that data produced via execution of said one instruction is unavailable;
   detecting a pending instruction for reading said data;
   updating one of said multi-bit registers based on each of said detecting steps;
   retrieving said data in response to said one instruction; and
   indicating, via said one multi-bit register, how far said retrieving step has progressed.

6. The method of claim 5, further comprising the step of detecting a data hazard based on said one multi-bit register.

7. The method of claim 5, further comprising the step of indicating, via said one multi-bit register, a speculative state of said one instruction.

8. The method of claim 5, furtherer comprising the steps of:
   retiring said one instruction; and
   transmitting a register identifier defined by said one instruction to said scoreboard,
   wherein said updating step is based on said retiring step.

9. The method of claim 5, further comprising the steps of:
   receiving said data; and
   updating said one multi-bit register in response to said receiving step.

10. The method of claim 5, further comprising the steps of:
    detecting whether said one instruction can be canceled based on said one multi-bit register; and
    canceling said one instruction based on said detecting whether said one instruction can be canceled step.

11. The method of claim 5, further comprising the steps of:
    transmitting a register identifier defined by said one instruction to said scoreboard; and
    selecting said one register based on said register identifier,
    wherein said updating step is performed based on said selecting step.

12. A method for processing instructions of a computer program, comprising the steps of:
    providing a pipeline and a scoreboard, said scoreboard including a plurality of multi-bit registers;
    processing one of said instructions via said pipeline;
    detecting that data produced via execution of said one instruction is unavailable;
    detecting a pending instruction for reading said data; and
    updating one of said multi-bit registers based on each of said detecting steps,
    wherein said updating step is performed such that said one multi-bit register indicates whether a pending write associated with said one instruction exists and whether said one instruction may be canceled.

13. A method for processing instructions of a computer program, comprising the steps of:
    providing at least one pipeline and a scoreboard, said scoreboard including at least one multi-bit register;
    processing at least one instruction via said one pipeline;
    identifying a register based on a register identifier defined by said one instruction;
    detecting whether data produced via execution of said one instruction has been written to said register identified in said identifying step;
    retiring said one instruction;
    transmitting said register identifier to said scoreboard in response to a detection in said detecting step that said data produced via execution of said one instruction has yet to be written to said register identified in said identifying step;
    changing a first bit in said one multi-bit register based on said register identifier transmitted in said transmitting step;
    controlling, subsequent to said retiring step, said one multi-bit register such that said one multi-bit register is indicative of whether said one instruction may be canceled; and determining, based on said controlling step, whether to cancel said one instruction.

14. The method of claim 13, wherein said controlling step comprises the step of updating said one multi-bit register such that said one multi-bit register is indicative of whether a pending instruction for reading said data has been detected.

15. The method of claim 13, further comprising retrieving said data in response to said one instruction, wherein said controlling step comprises the step of updating said one multi-bit register such that said one multi-bit register indicates how far said retrieving step has progressed before completion of said retrieving step.

16. A computer system for processing instructions of a computer program, comprising:

a plurality of pipelines configured to process and execute said instructions; and a scoreboard coupled to said pipelines, said scoreboard having a plurality of multi-bit registers, said scoreboard configured to receive a register identifier from one of said pipelines and to change a first bit in one of said multi-bit registers in response to said register identifier, said first bit indicating whether a pending write to a register identified by said register identifier exists, said register identifier associated with a load instruction processed by said pipeline, said scoreboard further configured to control a plurality of bits of said one multi-bit register such that said plurality of bits indicate which portions of a memory hierarchy have been searched in response to said load instruction.

17. The system of claim 16, further comprising circuitry configured to detect whether said load instruction can be canceled based on said plurality of bits.

18. The system of claim 16, furtherer comprising circuitry configured to transmit said register identifier to said scoreboard in response to a determination that said load instruction is retired while said pending write exists.

19. A system for processing instructions of a computer program, comprising:

a plurality of pipelines configured to process and execute said instructions; and a scoreboard coupled to said pipelines, said scoreboard indicative of which of a plurality of registers are associated with pending writes induced by retired instructions, said scoreboard comprising data indicative of which of said retired instructions may be canceled, wherein said data indicates which portions of a memory hierarchy have been searched in response to one of said retired instructions.

20. The system of claim 19, wherein said data indicates whether one of said retired instructions may be canceled based on whether a later instruction reads one of said registers associated with one of said pending writes induced by said one retired instruction.

21. The system of claim 19, wherein a portion of said data is stored in a multi-bit register of said scoreboard, said data portion indicative of whether one of said plurality of registers is associated with a pending write induced by one of said retired instructions.

22. The system of claim 21, wherein said data portion indicates whether said one retired instruction may be canceled based on whether a later instruction reads said one register.

23. A system for processing instructions of a computer program, comprising:

a plurality of pipelines configured to process and execute said instructions; and a scoreboard coupled to said pipelines, said scoreboard indicative of which of a plurality of registers are associated with pending writes induced by retired instructions, said scoreboard comprising data indicative of which of said retired instructions may be canceled, wherein a portion of said data is stored in a multi-bit register of said scoreboard, said data portion indicative of whether one of said plurality of registers is associated with a pending write induced by one of said retired instructions, wherein said data portion indicates which portions of a memory hierarchy have been searched in response to said one retired instruction.

24. A method for processing instructions of a computer program, comprising the steps of:

providing a pipeline and a scoreboard, said scoreboard including a plurality of multi-bit registers;

processing one of said instructions via said pipeline;

retrieving data in response to said one instruction;

writing said retrieved data to a register identified by a register identifier defined by said one instruction;

detecting that said data has yet to be written to said identified register;

determining how far through a memory hierarchy said retrieving step has progressed; and updating, prior to said writing step, one of said multi-bit registers based on said detecting step and said determining step.

25. The method of claim 24, further comprising the step of detecting whether said one instruction can be canceled based on said one multi-bit register.

26. The method of claim 24, further comprising the steps of:

retiring said one instruction; and transmitting said register identifier to said scoreboard in response to said retiring step, wherein said updating step is based on said register identifier.

* * * * *